July 2, 1929.  E. McKAIN  1,719,119
SEPARATOR
Filed May 11, 1927   2 Sheets-Sheet 1

Inventor
Edward McKain

Attorney.

July 2, 1929.  E. McKAIN  1,719,119
SEPARATOR
Filed May 11, 1927   2 Sheets-Sheet 2
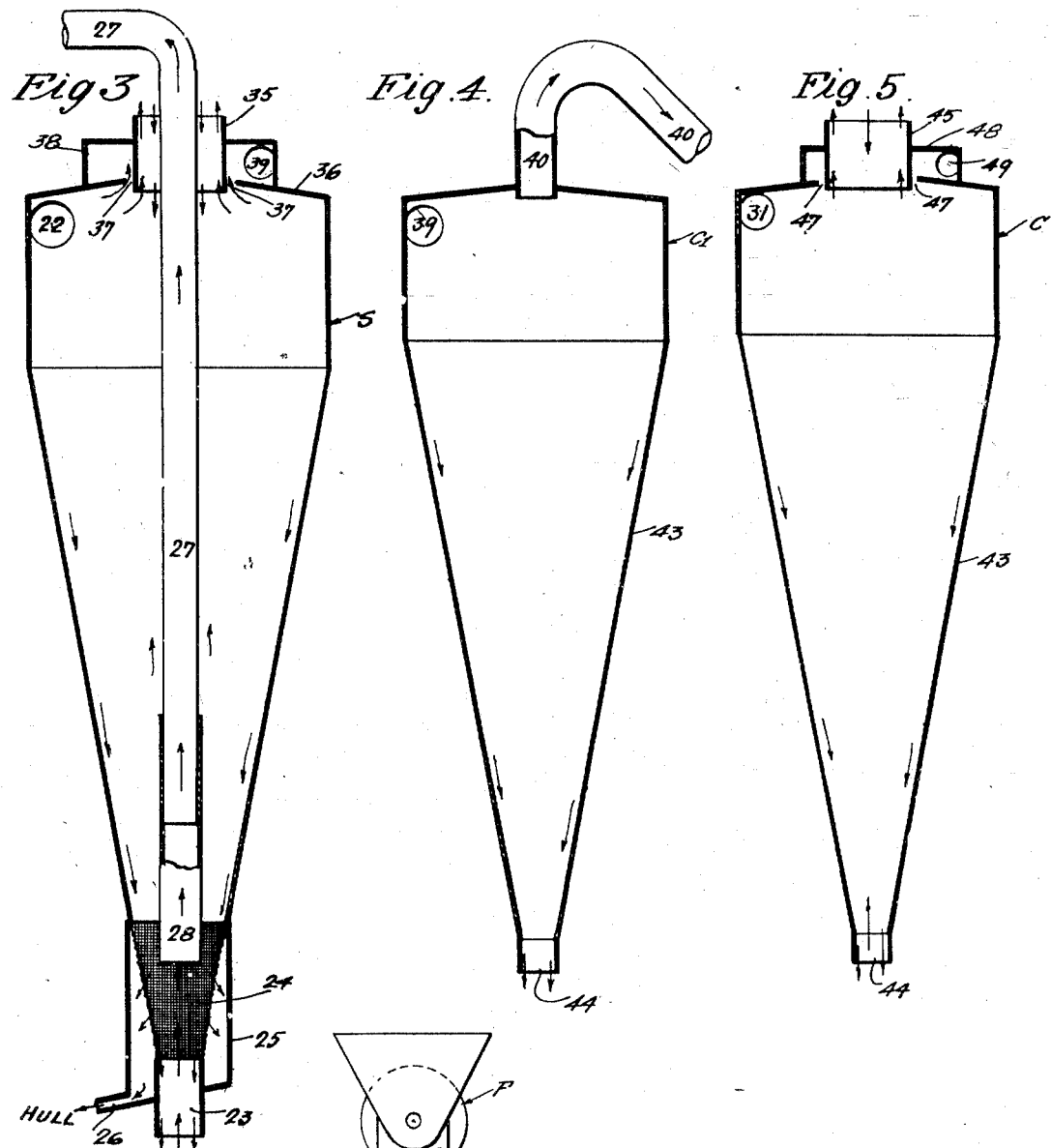
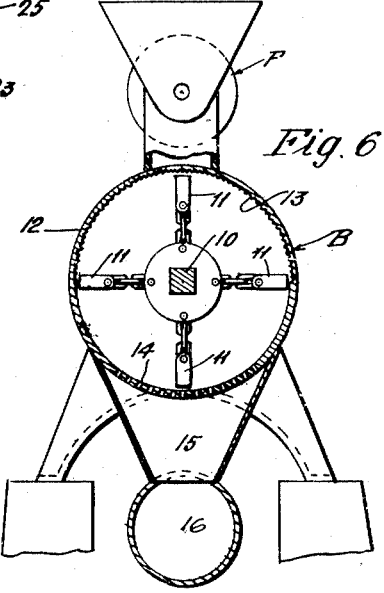
Inventor
Edward McKain
Attorney.

Patented July 2, 1929.

1,719,119

UNITED STATES PATENT OFFICE.

EDWARD McKAIN, OF LOS ANGELES, CALIFORNIA.

SEPARATOR.

Application filed May 11, 1927. Serial No. 190,574.

This invention has reference to treatment of cottonseed hulls or similar matter; the general object being the treatment of such matter for the separation and extraction of its valuable constituents.

After cotton has been ginned there is always a certain amount of lint remaining with and adhering to the seed and that lint remains with or adheres to the hull after the seed has been extracted. The hull and accompanying lint constitute about 50% by weight of the total seed and contains very substantial food, fertilizing and other values which are not now efficiently used. While the seed kernel itself is comparatively easily separated from the hull and lint, the separation of the hull from the lint has presented greater difficulties and although there is a large quantity of hull that either goes to waste or is used ineffectively, the problem of preparing the hulls and separating them from the lint has, so far as my knowledge goes, not yet been satisfactorily solved.

The main difficulties are two-fold: first the release of the hull from the adhering lint; second the separation of the hull from the lint. The lint adheres very closely to the hull and cannot be released therefrom by any ordinary means heretofore used, and after such release has been accomplished, the separation of the hull from the lint involves certain physical difficulties due mainly to the fineness of the lint. My present system overcomes these difficulties and effectively produces a clean and finely ground hull product and likewise a clean lint product, both of which are of some value. At present the hull product is perhaps of larger value than the lint, but certain parts of the lint, also separated in my system, have a specific value.

Figure 1:
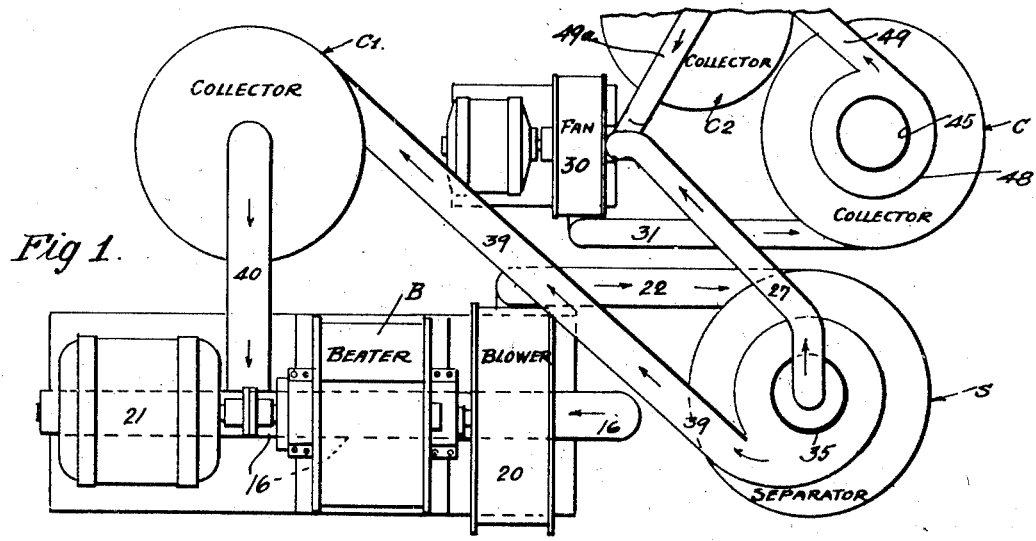
Figure 2:
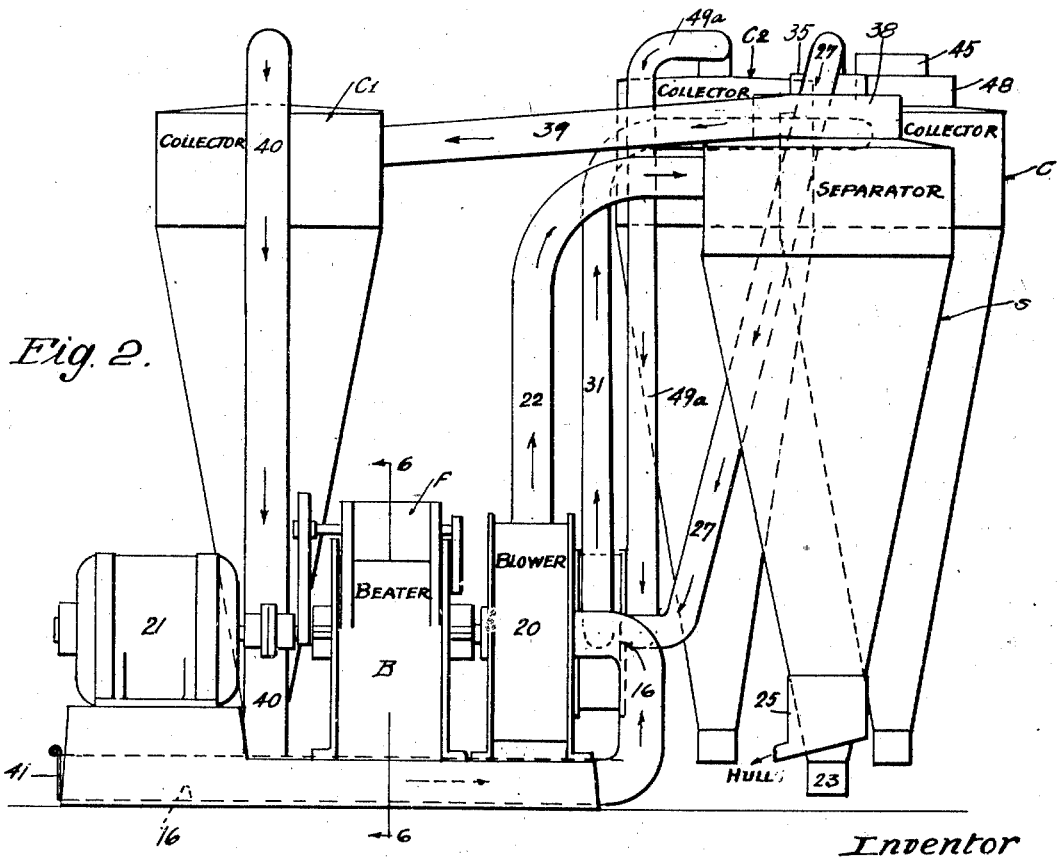

How my system accomplishes its objects will be best understood from the following detailed description of a preferred procedure and a preferred apparatus, reference for this purpose being had to the accompanying drawings, in which:

Fig. 1 is a plan of the apparatus;
Fig. 2 is a side elevation of the same;
Fig. 3 is an enlarged vertical central section of the separator;
Figs. 4 and 5 are similar sections showing the two collectors; and
Fig. 6 is a vertical cross section on line 6—6 of Fig. 2 showing the pulverizing mill or beater.

The hulls, with their adhering lint, are fed into the hopper of a feeder F by which they are fed into a pulverizing mill or beater B. The details of the feeder need not here be entered into, its only function being to feed the material to the beater B at a suitable rate.

Beater B functions to beat up and pulverize the material. Preferably it may be a machine of the type described in Letters Patent No. 1,580,620 to McKain, dated April 13, 1926. Such a machine has a central shaft 10 carrying a number of flail-like arms 11 which are thrown out to radial position by centrifugal force, the outer ends of the arms traveling close to the inner surface of casing 12. The upper part of the casing may be interiorly corrugated or roughened as indicated at 13, while the lower part of the casing is perforated at 14 for escape of the pulverized material. The machine operates at comparatively high speed, typically at about 3000 R. P. M., and it functions to throw the material out forcibly against the outer wall, the flails beating the material against the outer wall, so that it is finally very finely pulverized. The pulverization of the hulls and the accompanying beating completely releases the lint from attachment to the hulls, so that the material that finally passes out through the perforated bottom is merely a mixture of lint and finely pulverized hull. Pulverizing the hull not only releases the attachment of the lint, but also puts the hull in desirable form for final use. When the hull is pulverized a certain amount of its contained oil is released to the surface so that the final hull product is somewhat oily and therefore attractive as a feed. At the same time, however, this oily nature of the pulverized hull causes the lint more or less to stick to the hull, and the hull to have a tendency to loosely cake up in small masses, thus increasing the difficulties of final separation of the lint from the hull.

The mixture of pulverized hull and lint delivered from the bottom of the beater passes down through the chute 15 and directly into the air pipe 16. Air is flowing through this pipe at comparatively high velocity in the direction indicated by the arrows, blowing to the intake of blower 20 which is operated by the same motor 21 that drives the beater. The material drawn along in the air current to the blower is delivered with the air current from the blower through pipe 22 into the upper part of a separator S.

Pipe 22 enters the upper end of separator

S in a tangential direction so that a whirling air current is immediately set up inside the separator. The separator is in the form of an inverted cone with a final central outlet pipe 23 at its lower end and with a screened outlet 24 for hull also at its lower end. Around the conical screened outlet portion 24 there is a cylindrical casing 25 which confines the discharged hull and guides it to the final outlet 26. Within the conical shell of the separator there is a central pipe 27 which extends down to a point near the bottom of the separator, being preferably provided with an adjustable telescoping extension 28 so that the exact position of the lower end of this pipe may be nicely adjusted. Pipe 27 extends out through the top of the separator and goes to the intake of a fan 30 whose outlet goes through pipe 31 to the upper end of collector C. The function of this collector C is to collect the lint from the air current and finally to discharge pure clean lint.

Separator S has a central upper discharge flue 35 for air. This discharge flue extends down to a point somewhat below the flat conical roof 36 of the separator, as is best illustrated in Fig. 3; and an annular gap 37 is left between the inner edge of conical roof 36 and discharge flue 35. This annular gap leads into a casing 38 which surrounds flue 35; and a pipe 39 leads off tangentially from the chamber of casing 38 as is shown in Figs. 1 and 3. This pipe 39 discharges tangentially into the upper end of a collector C—1 whose nature will be explained later. The central air discharge flue 40 from this collector goes back to the air pipe 16, connecting into that air pipe at a point in advance of the discharge of beater B into the pipe. Air pipe 16 also has a damper controlled intake 41 for the controlled entrance of air from atmosphere. As will be readily understood from what follows, the balance of air pressures and currents through the various parts of the system are controllable not only by the proportioning of the various parts but also by certain adjustments, including the adjustment of damper 41. Generally speaking, the air in the system is kept circulating in a closed path; but for purposes of adjustment a certain amount of air may be admitted at 41.

Collector C—1 may comprise simply an inverted conical shell 43 with an outlet 44 for lint at its lower end, and the air outlet pipe 40 leading from its upper end. Collector C may be similar to collector C—1 except that it has a central stack air outlet at 45 like the central stack air outlet of separator S, and also has an annular casing 48 similar to 38 of the separator, and an airpipe 49 goes off from this casing 48 to a collector C² which may be just like collector C¹. From collector C² a pipe 49ª leads to the intake of fan 30. Collector C has an annular gap at 47 similar to the annular gap at 37 of separator S.

The mixture of pulverized hull and lint is first blown tangentially into the upper end of separator S and whirls around in that separator near the wall. At the same time that the air current is blown in at 22 an air current is being drawn out at 39, creating an upward draft through the annular opening 37. The lighter and finer part of the lint that enters separator S is drawn up through the annular gap 37 into chamber 38 and thus out through pipe 39 to collector C—1; and this lint is cleaned of all hull. The tangential direction of pipe 39 is such that the outflow of air through it tends to keep up the whirling motion as the air passes through the gap 37 and chamber 38. As soon as the hull enters separator S it begins to fall toward the bottom of the separator, but is carried around in a spiral path by a revolving current of air. The whole mass of air inside the separator is constantly in rotation. At the same time the air has vertical movements that will now be described. The amount of air taken out of the separator at 39 is controlled in volume (for instance by damper 41 and by the action in collector C—1) so that there is always a downward flow of the spiral stream of air, at least along and near the conical wall, toward the lower end of the separator. In a typical operation this spiral stream of air near the outer wall will flow out the lower outlet 23 to a certain extent, around the periphery of that outlet, while at the same time there is a small amount of air flow upwardly through the center of outlet 23. The heavier hull being thrown to the outside and dropping down through the separator falls against and is centrifugally thrown and kept more or less against the conical wall, and thus travels down the outer conical wall and is finally centrifugally thrown out through screen 24. To prevent any accompanying lint from being thrown out through screen 24 the adjustable tube 28 draws in at its lower end a certain draft of air from around it, drawing in the lint and drawing it then up through tube 27 and off to the collector C. The position of tube 28, and the amount of draft applied to it, are preferably so regulated that all, or substantially all, the lint reaching the lower end of the separator is drawn off, even though a small part of hull is also drawn off; thus leaving perfectly clean the hull discharged at 26. At the upper end of the separator the whirling air is constantly flowing out through stack 35 around its periphery; while at the same time a small flow of air is passing down through the center of stack 35 around tube 27. The amount of air thus flowing centrally into the separator at its upper and lower ends is typically less than the amount of air that is flowing out around the central inflow; but it will be seen that characteristically there is in the separator a whirling body of air that is centrifugally thrown against the outside wall, a certain amount of that air, keeping more or less to the outside wall, carries the hull out with it through the lower screened outlet; a certain amount of air passes out through the upper outlet 35 along its wall and up through the surrounding annular gap; while a certain amount of air flows axially into the separator shell at both upper and lower ends. The inflow at the lower end and the use of the tube 28 near that point causes any lint which may have gotten down that far to be drawn out through tubes 28 and 27. At the upper end the air current that passes out through annular gap 37 carries with it most of the lighter lint, as that lint is not centrifugally thrown to the outside wall as readily and quickly as the hull. The lint that thus goes out through pipes 39 to collector C—1 constitutes the lightest of the lint, cleanly separated from the hull. The pulverized hull that is drawn out through the outlet screen 24 at the bottom is cleanly separated from lint, and is in condition for use.

The functions of collectors C and C—1 are to gather the lint from the air currents and prevent the lint from being blown out into the atmosphere and thus lost. Collector C preferably has the additional function of separating a certain amount of lint from the accompanying hull. The lint carried in the air current through pipe 39 to collector C—1 is blown into that collector tangentially, and set into a spiral revolution around the wall of the collector. This spiral revolution throws the lint to the outside and it then travels down the conical wall so that it finally passes out around the outside of final outlet 44. The regulation of damper 41 for the purpose of putting more air into separator S through pipe 22 than is taken out of that separator through pipe 39 also has the effect that somewhat more air is put into collector C—1 through pipe 39 than is taken out through pipe 40. Consequently, in addition to spiral motion of the air in collector C—1 there is a movement of the air along the wall toward the bottom. This downward movement of the air carries the lint along with it, the lint being more or less thrown against the outer wall, and falling onto the conical outer wall as it travels down. Thus the lint is carried out through bottom outlet 44 by the downward current of air that passes out at the periphery of that outlet. Air drawn out from collector C—1 through pipe 40 is substantially free of lint. This air passes back directly to the initial air intake pipe 16 instead of discharging to atmosphere; the proper regulation of the whole system being thereby facilitated and any remaining slight amount of lint being thus kept from blowing out into the atmosphere.

The lint that is carried off in the air current through pipe 27 goes first to the intake of fan 30. It is blown by that fan through pipe 31 tangentially into the upper end of collector C where the action is much the same as in collector C—1 except that here the air passes out around the periphery of the air stack 45 as it does through the air stack 35 in separator S, and also passes out through the annular gap 47 to the pipe 49. Pipe 49 goes to final collector $C^2$, and from that collector pipe $49^a$ goes back to the intake of fan 30, so that any lint which is carried out through pipe $49^a$ is kept in the closed circuit of the system through the fan 30. A certain amount of lint separated in collector C goes to collector $C^2$ and is finally thrown out at the bottom of that collector; and a certain amount of lint with a small amount of hull admixed is discharged from the bottom of collector C. Collector C thus not only acts as a collector to finally throw out the remaining small amount of lint and hull mixture, but also acts as a separator to separate off a major portion of lint which is then finally collected in collector $C^2$.

The fine light lint first separated in separator S and thrown out of collector $C^1$ comprises the lint having the greatest cellulose content; while that separated in collector C and thrown out through collector $C^2$ is coarser; but both are completely clean of hull. Only a small proportion of the total lint is thrown out through the bottom of collector C, and this lint carries with it only a very small percentage of hull.

If for any reason a second separation of lint in collector C is not desired, all the lint, with the accompanying small amount of hull, that goes off from separator S through pipe 27 may be immediately collected, as by going immediately to collector $C^2$.

I claim:

1. A separator of the character described, comprising an inverted conical shell having an inlet near its upper end an outlet at its lower smaller end, a portion of the shell wall just above said outlet being composed of screen, an outlet shell surrounding the screen wall to confine and direct material which is blown through the screen, the top wall of the separator shell being slightly conical, an air flue extending from the center of said top wall, there being an annular gap in the top wall immediately surrounding the flue, the lower end of the flue projecting somewhat below said top wall, an annular chamber surrounding said flue above the top wall and with which the annular gap communicates, and an air outlet pipe leading tangentially from said annular chamber.

2. A separator of the character described, comprising an inverted conical shell having a tangential air inlet near its upper end and an outlet at its lower smaller end, a portion of the shell wall just above said outlet being composed of screen, an outlet shell surrounding the screen wall to confine and direct material which is blown through the screen, the top wall of the separator shell being slightly conical, an air flue extending from the center of said top wall, there being an annular gap in the top wall immediately surrounding the flue, the lower end of the flue projecting somewhat below said top wall, an annular chamber surrounding said flue above the top wall and with which the annular gap communicates, and an air outlet pipe leading tangentially from said annular chamber, the tangential direction of said outlet pipe being such as to keep up air rotation in said annular chamber in the same direction as set up in the separator shell by the tangential entry of air through the inlet.

3. A separator of the character described, comprising an inverted conical shell having a tangentially arranged inlet near its upper end and an outlet at its lower smaller end, a portion of the shell wall just above said outlet being composed of screen, an outlet shell surrounding the screen wall to confine and direct material which is blown through the screen, the top wall of the separator shell being slightly conical, an air flue extending from the center of said top wall, there being an annular gap in the top wall immediately surrounding the flue, the lower end of the flue projecting somewhat below said top wall, an annular chamber surrounding said flue above the top wall and with which the annular gap communicates, an air outlet pipe leading tangentially from said annular chamber, the tangential direction of said outlet pipe being such as to keep up air rotation in said annular chamber in the same direction as set up in the separator shell by the tangential entry of air through the inlet, and a central air outlet pipe depending through the center of the separator shell and having an open lower end at a point near the screen wall of the separator shell.

In witness that I claim the foregoing I have hereunto subscribed my name this 6th day of May 1927.

EDWARD McKAIN.